June 9, 1959     E. B. HUDSON     2,890,064
FLUID PRESSURE ACTUATED STABILIZER FOR MOTOR VEHICLES
Filed March 1, 1957     2 Sheets-Sheet 1
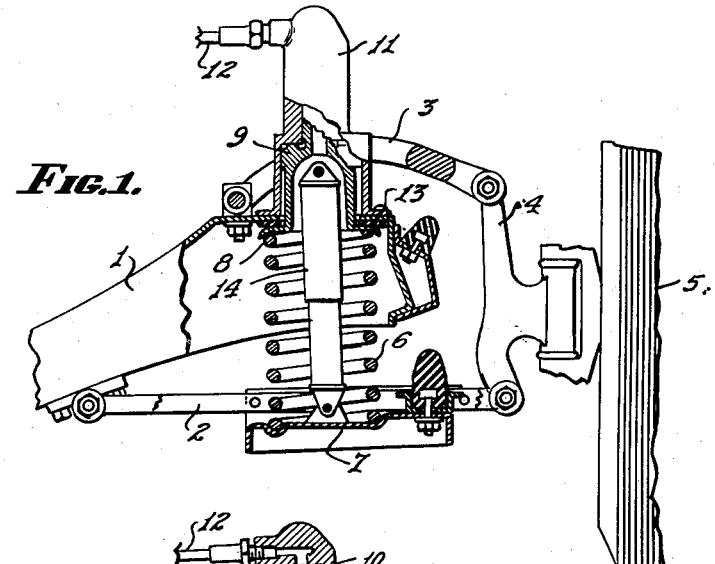
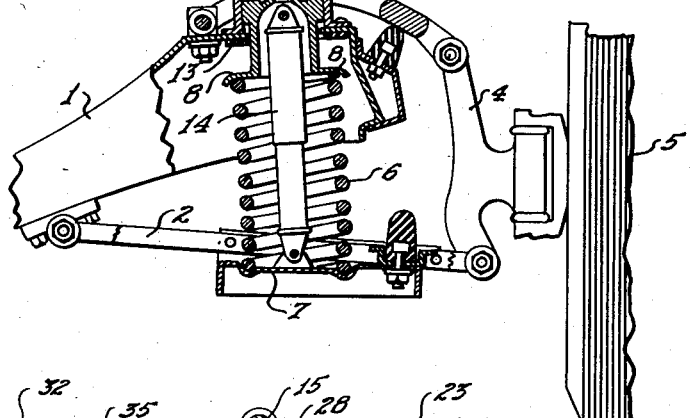
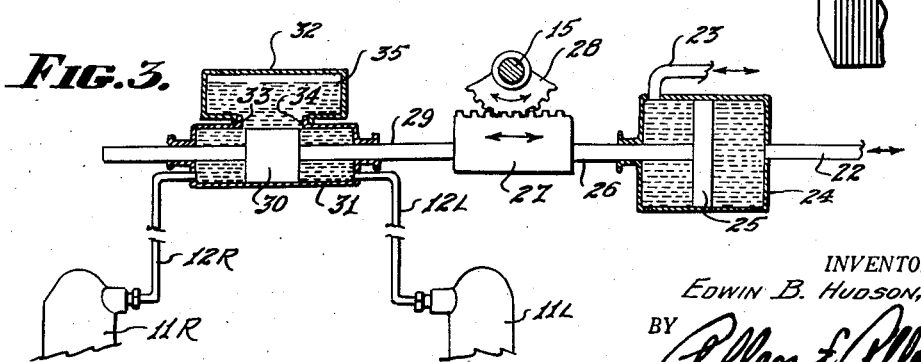
INVENTOR.
EDWIN B. HUDSON,
BY Allen & Allen
ATTORNEYS.

June 9, 1959            E. B. HUDSON            2,890,064

FLUID PRESSURE ACTUATED STABILIZER FOR MOTOR VEHICLES

Filed March 1, 1957            2 Sheets-Sheet 2

INVENTOR.
EDWIN B. HUDSON,
BY
ATTORNEYS.

United States Patent Office 2,890,064
Patented June 9, 1959

2,890,064

FLUID PRESSURE ACTUATED STABILIZER FOR MOTOR VEHICLES

Edwin B. Hudson, Middletown, Ohio

Application March 1, 1957, Serial No. 643,424

9 Claims. (Cl. 280—112)

My invention has to do with stabilizing means for automatically banking the body of a motor vehicle traveling in a curved path, and more particularly relates to an improved knee action control which, while stabilizing the vehicle in a turn, nevertheless does not interfere with the normal knee action springing of the running gear. That is to say, the banking control is such that the running gear is fully sprung at all times irrespective of the operation of the banking control.

In a conventional motor vehicle having knee action, the front wheel suspension allows each front wheel to rise and fall, due to changes in road surface level, without appreciably affecting the opposite wheel so long as the vehicle is traveling in a straight path. However, when the vehicle is traveling in a curved path, the outside front wheel suspension spring is compressed to a greater degree than is the inside wheel suspension spring. For example, when the vehicle is traveling in a curved path to the left, the right front of the vehicle body is lower than the left front and the vehicle appears to be banking to the outside of the curve. This condition is known as "cornering," and when observed at higher speeds the vehicle is said to not "corner" well. While heretofore numerous attempts have been made to solve the "cornering" problem by providing various types of mechanical and hydraulic stabilizing devices effective to prevent or minimize outside banking of the vehicle body, such devices are generally connected between the sprung and unsprung parts of the running gear and hence in whole or in part bypass the spring suspension when in use.

A principal object of my invention is the provision of stabilizing means which will automatically correct for undesirable "cornering" of the vehicle while at the same time retaining full advantage of the normal suspension springs. With my invention the vehicle is fully sprung at all times and there is no direct mechanical connection between the sprung and unsprung portions of the running gear excepting as occur through the suspension springs themselves.

A further object of my invention is to provide automatic correction for "cornering" by compensating for the extra deflection on the front outside spring suspension without any corresponding correction to the inside spring suspension.

A further object of my invention is the provision of a stabilizing system which may be sensed and controlled by the conventional hydraulic steering equipment of the vehicle. Thus, in accordance with my invention, the banking control can be made a slave to the hydraulic steering system.

Still a further object of my invention is to provide an alternate means having a self-contained hydraulic system for sensing and controlling the stabilizing devices which is mechanically operated by the hydraulic steering device. Such self-contained hydraulic system may be mechanically connected to the hydraulic assist cylinder of the steering device. This arrangement has the advantage that the fluid supply does not have to be proportioned between the steering assist cylinder and the suspension hydraulic cylinders.

Yet a further object of my invention is the provision of automatically operated stabilizing means which are of relatively simple and economical construction and which, as already indicated, can be utilized in vehicles incorporating conventional spring suspensions.

The foregoing, together with other objects of my invention which will appear hereinafter or which will be understood by those skilled in the art upon reading these specifications, I accomplish by those constructions and arrangements of parts of which I shall now describe certain exemplary embodiments.

Reference is made to the accompanying drawings wherein:

Figure 1 is a side elevational view with parts in section illustrating a conventional knee action construction to which the compensating hydraulic cylinder and piston arrangement of my invention has been added. The figure illustrates the parts as they appear when the vehicle is traveling in a straight path.

Figure 2 is a side elevational view similar to Figure 1 but illustrating the position of the parts when the vehicle is in a turn, the running gear illustrated being that which is to the outside of the turn.

Figure 3 is a diagrammatic illustration of an independent hydraulic control system for the stabilizers, the right hand portion of the figure also serving to illustrate the mechanical connection of the control system to the hydraulic assist cylinder of a hydraulic steering device.

Figure 4:
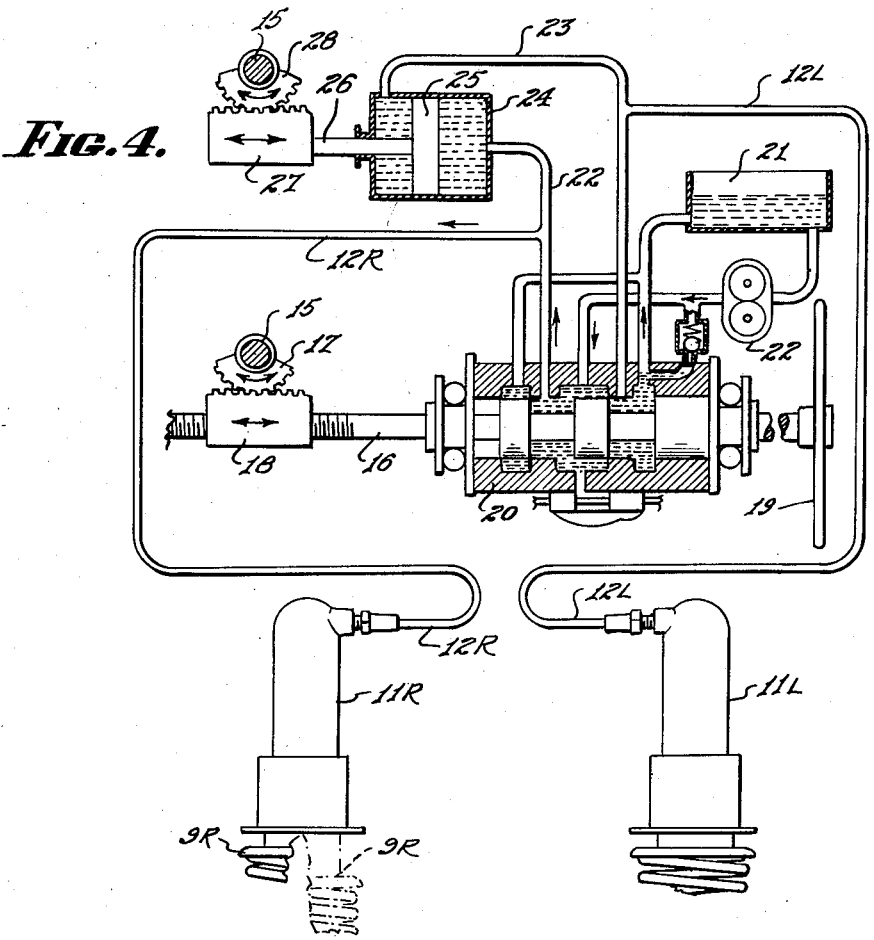
Figure 4 is a diagrammatic view illustrating the application of my invention to a conventional hydraulic steering system.

Referring first to Figures 1 and 2 of the drawings, I have therein illustrated a vehicle frame 1 which pivotally mounts lower arm 2 and upper arm 3 of the running gear, the free ends of the arms being pivotally connected to the opposite ends of steering knuckle 4 to which the wheel assembly 5 is mounted. A suspension spring 6 extends between the frame 1 and a spring retaining plate 7 carried by the lower arm of the running gear. At its upper end the suspension spring 6 seats against the flanged lower end 8 of piston 9 fitted in bore 10 of hydraulic cylinder 11. The cylinder 11 is fixedly secured to the frame 1 and is positioned to overlie the suspension spring 6. Fluid under pressure is introduced into the upper end of the cylinder through conduit 12, the fluid entering the bore 10 between the upper end of the cylinder and the piston 9, thereby causing the piston to move relative to the cylinder.

When the vehicle is traveling in a straight path the pistons 9 will be in retracted position, which is the position illustrated in Figure 1, with the flanged lower ends 8 seated against the bumpers 13 secured to the frame 1. The hydraulic fluid in conduit 12 will be at zero pressure, and it will be apparent that the suspension spring 6 will serve to spring the vehicle in conventional manner. If desired, a shock absorber 14 may be utilized, the shock absorber being secured at its lower end to the plate 7 and at its upper end to the piston 9.

Figure 2 illustrates the outside wheel suspension when the vehicle is in a turn. As will be explained more fully hereinafter, fluid will be supplied to the upper end of cylinder 11 in proportion to the severity of the turn and, as the fluid enters the bore 10, it will cause relative movement between the piston 9 and cylinder 11. This movement has the effect of moving the cylinder 11 and the frame 1 upwardly relative to suspension spring 6, thereby compensating for the deflection of the frame toward the outside spring suspension. Literally, the frame is lifted relative to the spring suspension. However, with this arrangement the suspension spring is fully operative at all times for its primary function of absorbing road shocks and the like. It will be understood that as the vehicle comes out of the turn, the hydraulic fluid will be drained from the cylinder 11 and the parts will reassume their normal running position with the flanged lower end of the piston seated against the frame 1.

Referring now to Figure 4 of the drawings, I have therein illustrated a control system for the hydraulic cylinders which is formed as an integral part of a conventional hydraulic steering system. As seen in the drawings, the shaft 15 represents the mechanical steering connection to the front wheels, the shaft being connected to the steering shaft 16 by means of segment gear 17 and rack 18 which is threaded on the steering shaft. The steering shaft is rotated by means of steering wheel 19.

A conventional hydraulic steering assist is indicated at 20, hydraulic fluid being supplied from reservoir 21 by means of pump 22. Conduits 22 and 23 are arranged to supply fluid from the hydraulic steering assist 20 to opposite ends of a hydraulic assist cylinder 24 having a piston 25. A piston rod 26 projects from one end of the assist cylinder and carries a rack 27 which engages a segment gear 28 fixedly secured to the shaft 15. With this arrangement, hydraulic fluid will be fed to the cylinder 24 through either the conduit 22 or the conduit 23, depending upon the direction in which the steering wheel is turned, thereby causing the piston 25 to move within the cylinder. The volume of hydraulic fluid supplied through either of the conduits will depend upon the degree to which the steering wheel has been turned, and the piston 25 will be moved in proportion to the volume of fluid supplied. Movement of the piston 25 causes the vehicle wheels to turn as the shaft 15 is rocked by the action of rack 27 on pinion gear 28. For example, when making a left turn the parts will be in the position illustrated in Figure 4, and piston rod 26 and piston 25 will be moved to the left by fluid supplied to cylinder 24 through conduit 22. At the same time fluid will be discharged from the opposite end of cylinder 24 through conduit 23 for return to the unit 20. The movement of piston 25 and piston rod 26 will continue only so long as the steering wheel is rotated, and when movement of the steering wheel is stopped, the movement of the piston and piston rod will also stop and the parts will remain in the position established by the steering wheel.

In accordance with my invention, the conduits 12R and 12L leading to the stabilizer control cylinders 11R and 11L are connected to the conduits 22 and 23, respectively, in substantially the manner illustrated. With this arrangement, hydraulic fluid flowing through either of the conduits 22 or 23 will be divided between the assist cylinder 24 and one or the other of the stabilizer cylinders 11R, 11L. Thus, when making a left turn, a portion of the fluid flowing through conduit 22 will be diverted through conduit 11R so as to cause the piston 9R to move from the position illustrated in solid lines to the position illustrated in dotted lines. As in the case of piston 25, the travel of the piston 9R will be directly proportional to the volume of hydraulic fluid supplied to the stabilizer cylinder; and, as already indicated, the volume of fluid is directly proportional to the severity or degree of the turn.

From the foregoing, it will be apparent that the automatic stabilizer control is directly operable from the hydraulic steering mechanism for the vehicle. The quantity of hydraulic fluid supplied to the stabilizer control cylinders is in proportion to the angular movement of the steering wheel and hence provides the proper degree of banking for any degree of turn. When the steering wheel is in straight travel position, no fluid is supplied to the control cylinders, whereas when the steering wheel is turned full over, as for a left turn, the right stabilizer cylinder 11R will receive full fluid charge to insure maximum banking of the vehicle. Similarly, for every angular position of the steering wheel intermediate straight travel and full over positions, a proportionate quantity of fluid is supplied to the stabilizer cylinders to provide the proper degree of banking. It will be readily apparent that for a right turn, the flow of hydraulic fluid will be through conduit 23 to the opposite end of cylinder 24, with a portion of the fluid flowing through conduit 12L to control cylinder 11L.

It is also within the scope of my invention to provide a separate hydraulic system for the stabilizer cylinder which is mechanically coupled to the hydraulic steering mechanism. Thus, as seen in Figure 3, a second piston rod 29 is connected to the rack 27, the last named piston rod mounting a piston 30 slidable within a two-way hydraulic cylinder 31. The piston 30 is normally centrally disposed within the cylinder 31 and a fluid reservoir 32 is arranged to communicate with the cylinder, the arrangement of parts being such that, when the piston is centrally disposed, ports 33 and 34 are in communication with opposite ends of the cylinder and the fluid 35 is free to flow between the reservoir and either end of cylinder 31. The mechanical connection between the rack 27 and piston rod 29 is such that the piston 30 will be centrally disposed when the vehicle is traveling in a straight path.

When the piston 30 is moved to the left in Figure 3, as would occur when the steering wheel is turned so as to cause piston 25 in cylinder 24 to move to the left, i.e. upon making a left turn, port 33 will be closed and the fluid in the cylinder 31 ahead of the piston will be driven through the conduit 12R connected to hydraulic stabilizer cylinder 11R. It will be apparent that movement of the piston 30 will in no way affect the open condition of port 34 and hence there will be no build-up of fluid in conduit 12L leading to control cylinder 11L. As the steering gear of the vehicle is turned in the opposite direction to bring it out of the turn, the piston rod 29 will be moved to the right, thereby returning piston 30 to its central position. This movement reopens port 33 and vents conduit 12R, thereby permitting the piston in stabilizer cylinder 11R to retract. It will be apparent that for a right turn, the port 34 will be closed with the resultant discharge of fluid from the cylinder 31 into the conduit 12L. With the arrangement just described the necessity for dividing the hydraulic fluid between the stabilizer cylinders and the assist cylinder 24 is eliminated and the required volume of fluid can be supplied directly from cylinder 31, thereby providing for independent adjustment of the steering and stabilizing units.

With either of the foregoing control systems, it is preferred that the system be calibrated to raise the outer side of the vehicle slightly higher than the inner or turn side to improve the banking effect. Thus, should the vehicle be in a left turn, it is preferred that the right control cylinder elevate the right side of the frame somewhat above its normal horizontal plane, thereby causing the vehicle body to bank in the direction of the turn. When so operated, the control system serves to improve the performance and handling qualities of the vehicle when traveling in a curved path and, at the same time, full use is made of the suspension springs for their intended purpose and at no time is the suspension bypassed either in whole or in part.

Modifications may, of course, be made in my invention without departing from the spirit of it. For example, while I have described my invention as it applies to the knee action springing of the front running gear, the invention also could be applied to the rear spring suspension if it were desired to further improve the "cornering" performance of the vehicle.

Having thus described my invention in certain exemplary embodiments, what I desire to secure and protect by Letters Patent is:

1. In a banking control device for a motor vehicle when traveling in a curved path, said vehicle having a frame, a wheel assembly and a hydraulic steering mechanism controlled by a steering wheel, a suspension spring connected to said wheel assembly and extending between said wheel assembly and a banking control cylinder fixedly mounted on said frame, said cylinder having a piston to which said spring is operatively connected, whereby relative movement may be effected between said piston and cylinder so as to effectively raise and lower said frame relative to said spring and said wheel assembly, said piston having a retracted position in which the end of said suspension spring connected to said piston is effectively seated against said frame, said piston occupying the said retracted position when the vehicle is traveling in an essentially straight path, and a two-way control cylinder for supplying hydraulic fluid to said banking control cylinder, said last named cylinder having a piston therein operatively connected to the hydraulic steering mechanism for said vehicle, said piston being movable within said control cylinder upon turning movement of said steering wheel and effective to supply fluid to said banking control cylinder in proportion to the angular movement of said steering wheel.

2. The device claimed in claim 1 including a reservoir for supplying hydraulic fluid to said control cylinder, a port communicating between said reservoir and said control cylinder, said port being closable upon movement of said control cylinder piston in one direction.

3. The device claimed in claim 2 including a second port connecting said reservoir and said control cylinder, said last named port being closable upon movement of said control cylinder piston in the opposite direction.

4. In an automatic banking control for a motor vehicle having a frame, a wheel assembly comprising upper and lower arms pivotally connected at one end to said frame and pivotally connected at their opposite ends to a steering knuckle, a spring retaining plate secured to said lower arm, a helical suspension spring supported at its lower end on said plate, a hydraulic cylinder mounted on said frame above said suspension spring, said cylinder including a normally retracted piston terminating beyond the end of said cylinder in a projecting flange engaging the upper end of said suspension spring, said piston extending through an opening in said frame with said projecting flange seated against said frame when said piston is in its retracted position, and means for supplying hydraulic fluid to the upper end of said cylinder, whereby to produce relative movement between said cylinder and said piston.

5. The structure claimed in claim 4 including a shock absorber extending between said plate and said piston.

6. The structure claimed in claim 5 wherein said shock absorber lies within the confines of said suspension spring.

7. In a stabilizing device for a motor vehicle when traveling in a curved path, said vehicle having a hydraulic steering system controlled by a steering wheel, a frame, and a wheel assembly separated from said frame by a suspension spring, said device comprising a banking control cylinder fixedly mounted on said frame, a piston for said cylinder, a suspension spring having one end thereof operatively connected to said piston and the opposite end thereof connected to the wheel assembly of said vehicle, said piston having a retracted position in which the end of said suspension spring connected to said piston is effectively seated against said frame, said piston occupying said retracted position when the vehicle is traveling in a straight path so that said spring acts directly between said frame and said wheel assembly and said banking control cylinder is not required to support said spring, and means operatively connected to said hydraulic steering system for supplying fluid under pressure to said banking cylinder, the volume of said fluid being in proportion to the angular position of the steering wheel for said vehicle, whereby to effect relative movement between said banking cylinder and said piston in direct proportion to the angular position of the steering wheel and thereby effect relative movement between said frame and the first named end of said suspension spring.

8. The stabilizing device claimed in claim 7 wherein the means operatively connected to said hydraulic steering system for supplying fluid to said cylinder comprises a two-way control cylinder having a piston therein movable in proportion to the turning movement of said steering mechanism.

9. In a banking control device for a motor vehicle having a frame and a wheel assembly on each side of said frame, a suspension spring connected to each of said wheel assemblies and extending between the said assemblies and a banking control cylinder mounted on each side of said frame, said cylinders each having a piston to which the coacting spring is operatively connected, said pistons each having a retracted position in which the end of the suspension spring connected to the coacting control cylinder is effectively seated against said frame, said pistons occupying the said retracted position when the vehicle is traveling in a straight path so that the said springs act directly between said frame and said wheel assemblies and said control cylinders are not required to support said springs, a hydraulic steering system controlled by a steering wheel, and means operatively connected to said hydraulic steering system for selectively injecting hydraulic fluid into one end of each of said banking control cylinders so as to effect relative movement between each such cylinder and the piston thereof, said last named means comprising a two-way control cylinder effective, upon turning movement of said steering mechanism, to supply fluid to either of said banking control cylinders, depending upon the direction of turning movement, in direct proportion to the angular position of the vehicle steering wheel.

References Cited in the file of this patent
UNITED STATES PATENTS

| | | |
|---|---|---|
| 2,110,809 | Murphy | Mar. 8, 1938 |
| 2,165,617 | Paes | July 11, 1939 |
| 2,279,120 | Hurley | Apr. 7, 1942 |
| 2,556,288 | Milster | June 12, 1951 |
| 2,650,108 | Bruce | Aug. 25, 1953 |
| 2,743,941 | Walker | May 1, 1956 |
| 2,757,938 | Crowder | Aug. 7, 1956 |
| 2,809,051 | Jackson | Oct. 8, 1957 |